United States Patent
Hara et al.

(10) Patent No.: US 7,070,248 B2
(45) Date of Patent: Jul. 4, 2006

(54) VEHICLE BRAKING FORCE CONTROL DEVICE AND CONTROL METHOD OF THE SAME

(75) Inventors: Masahiro Hara, Susoni (JP); Kouji Yotsuya, Numadu (JP); Yasuji Mizutani, Susono (JP); Tomihiro Wada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/088,967

(22) Filed: Mar. 24, 2005

(65) Prior Publication Data

US 2005/0168065 A1 Aug. 4, 2005

Related U.S. Application Data

(62) Division of application No. 10/356,466, filed on Feb. 3, 2003, now Pat. No. 6,923,511.

(30) Foreign Application Priority Data

Feb. 8, 2002 (JP) ............................. 2002-031681

(51) Int. Cl.
*B60T 8/60* (2006.01)
(52) U.S. Cl. ............................. 303/155; 303/3; 303/15; 303/20
(58) Field of Classification Search ................. 303/3, 303/4, 15, 155, 166, 20
See application file for complete search history.

(56) References Cited

U.S. PATENT DOCUMENTS

| 5,669,676 | A | 9/1997 | Rump et al. |
| 6,120,110 | A | 9/2000 | Shimizu |
| 6,129,423 | A | 10/2000 | Hashimoto |
| 6,179,396 | B1 | 1/2001 | Fukami et al. |
| 6,189,986 | B1 | 2/2001 | Shimizu et al. |
| 6,328,389 | B1 | 12/2001 | Yotsuya et al. |

FOREIGN PATENT DOCUMENTS

| EP | 0 867 350 A2 | | 9/1998 |
| GB | 2 303 892 A | | 3/1997 |
| JP | A-09290743 | | 11/1997 |
| JP | A 10-273023 | | 10/1998 |
| JP | A 11-189133 | | 7/1999 |
| JP | A 11-278226 | | 10/1999 |
| JP | 2001138884 | * | 5/2001 |
| JP | A 2001-138884 | | 5/2001 |
| KR | 1020010076186 | * | 8/2001 |
| KR | A-2001-0076186 | | 8/2001 |

* cited by examiner

*Primary Examiner*—Devon C. Kramer
(74) *Attorney, Agent, or Firm*—Oliff & Berridge, PLC

(57) ABSTRACT

In a vehicle brake control device, it is determined whether a first starting condition, that a master cylinder pressure and a rate of change of the master cylinder pressure are equal to or more than respective first reference values, is satisfied. Furthermore, it is determined whether a second starting condition is satisfied based on a determination as to whether the master cylinder pressure is equal to or more than a second reference value at a time when a predetermined time has elapsed since a time when the first starting condition was satisfied. In a case where the second starting condition is determined as being satisfied, a brake assist control is executed until a termination condition of the brake assist control is satisfied.

5 Claims, 7 Drawing Sheets

FIG. 1
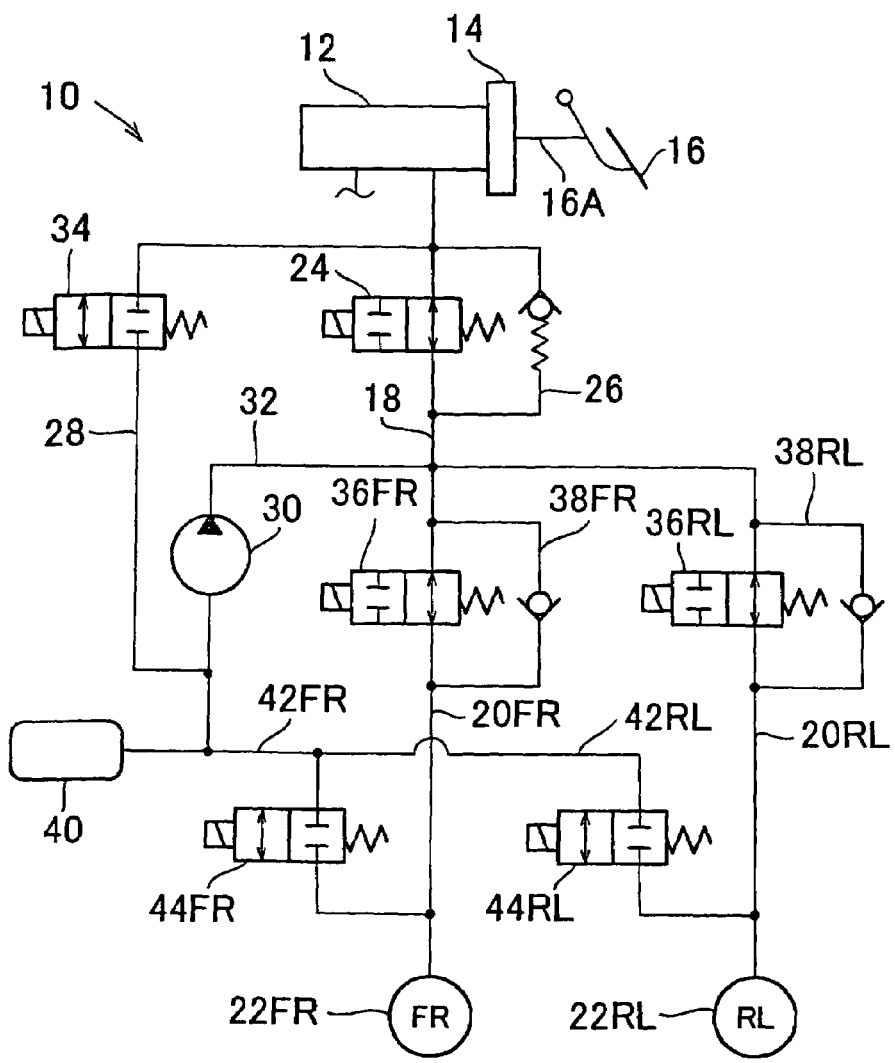
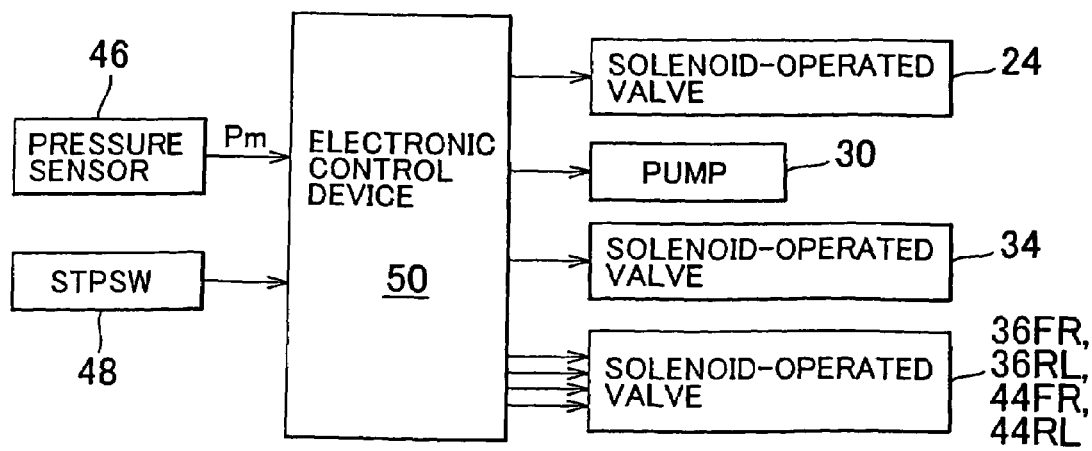

VEHICLE BRAKING FORCE CONTROL DEVICE AND CONTROL METHOD OF THE SAME

This is a division of application Ser. No. 10/356,466 filed Feb. 3, 2003 now U.S. Pat. No. 6,923,511. The entire disclosure of the prior application is hereby incorporated by reference herein in its entirety.

INCORPORATION BY REFERENCE

The disclosure of Japanese Patent Application No. 2002-031681 filed on Feb. 8, 2002 including the specification, drawings and abstract are incorporated herein by reference in its entirety.

BACKGROUND OF THE INVENTION

The invention relates to a vehicle braking force control device. More specifically, the invention relates to a vehicle braking force control device which executes a brake assist control that generates a braking force higher than that at a normal time, when an operation state of a driver with respect to a brake operating member is a predetermined state.

One braking force control device for a vehicle such as an automobile is, for example, the braking force control device disclosed in Japanese Patent Application Laid-open 9-290743, which is also an application of the applicant of the present invention. In particular, this braking force control device is configured such that a brake assist control is executed when a master cylinder pressure is equal to or more than a reference value thereof, and a rate of change of the master cylinder pressure is equal to or more than a reference value thereof. Moreover, another braking force control device is configured such that when a master cylinder pressure is equal to or more than a reference value thereof, and after a rate of change of the master cylinder pressure becomes equal to or more than a reference value thereof, a brake assist control is started when the rate of change of the master cylinder pressure becomes equal to or less than a pressure rise gradient of an oil pump.

According to the braking force control devices described above, the brake assist control is executed when a rapid braking operation is performed by a driver when, for example, avoiding a potential risk. A brake pressure of each wheel is controlled to a higher pressure than the master cylinder pressure, and thus, delayed braking of the vehicle caused by a lack of depression force of the driver can be effectively prevented.

Generally speaking, there are a variety of brake operations performed by a driver when braking a vehicle. Once example is so-called tapping, where a depression amount is decreased relatively rapidly after the brake pedal is depressed relatively rapidly. When this tapping brake operation is performed, there is no need for the brake assist control to be executed.

However, in the aforementioned conventional braking force control devices, fundamentally, when the master cylinder pressure is equal to or more than the reference value thereof and the rate of change of the master cylinder is equal to or more than the reference value thereof, brake assist control is executed. Therefore, as a result of the tapping brake operation being performed by the driver, a problem occurs where the brake assist control is executed unnecessarily when the master cylinder pressure is equal to or more than the reference value thereof and the rate of change of the master cylinder pressure becomes equal to or more than the reference value thereof.

Furthermore, a condition where a negative pressure of a vacuum type booster of the brake device is decreased to a lower value than a normal value will be described, as an example. In this case, even when the driver performs a rapid braking operation, the master cylinder pressure and the rate of change thereof do not become as high as when the negative pressure of the booster is the normal value. As a result, there are cases where the brake assist control is not executed despite a condition existing where it is preferable that brake assist control be executed.

SUMMARY OF THE INVENTION

The invention takes into consideration the aforementioned problems in the conventional vehicle braking force control devices, which were configured such that the brake assist control is executed, fundamentally, when the master cylinder pressure is equal to or more than the reference value of the master cylinder pressure and the rate of change of the master cylinder pressure is equal to or more than the reference value of the rate of change of the master cylinder pressure. A key object of the invention is to finally determine whether to execute a brake assist control based on an operation state of a driver when a predetermined time has elapsed since a time when an operation state of the driver with respect to a brake operating member has become a predetermined state. This prevents the brake assist control from being executed unnecessarily in a case where the driver performs a tapping brake operation, and moreover, prevents this despite the existence of a condition where it is preferable that the brake assist control be executed. Accordingly, it is possible to prevent execution of brake assist control which leads to a decrease in the responsiveness of the brake operating member.

According to the invention, the aforementioned object is achieved by a vehicle braking force control device which executes a brake assist control such that a braking force is generated which is higher than that at a normal time when an operation state of a driver with respect to a brake operating member is a predetermined state. This vehicle braking force control device is such that the brake assist control is started when an operation amount of the driver with respect to the brake operating member is equal to or more than a reference value, at a time when a first predetermined time has elapsed since a time when the operation state of the driver with respect to the brake operating member has become a predetermined operation state (a configuration of a first aspect). Alternatively, a vehicle braking force control device executes brake assist control such that a braking force is higher than that at a normal time when an operation state of a driver with respect to a brake operating member is a predetermined state. This vehicle braking force control device starts a brake assist control when an operation amount of the driver with respect to the brake operating member is equal to or more than a reference value of the operation amount, at a time when a second predetermined time has elapsed since a time when an operation speed of the driver with respect to the brake operating member became equal to or less than a reference value of an operation speed, after the operation state of the driver with respect to the brake operating member has become the predetermined operation state (a configuration of a second aspect).

Generally, when a rapid braking operation is performed by a driver, for example, when avoiding a risk, a depression amount and a depression speed of a brake pedal generated by the driver become large, and the depression amount of the brake pedal is maintained at a high value for a relatively long period. On the contrary, when a tapping brake operation is performed by the driver, the depression amount and the depression speed of the brake pedal generated by the driver are large initially. However, a condition where the depression amount of the brake pedal is large is not maintained, and the depression amount of the brake pedal decreases to a relatively low value and the depression speed of the brake pedal becomes a negative value.

A vehicle braking force control device according to one embodiment of the invention is provided with a brake operating member, and a control portion which starts a brake assist control for generating a braking force higher than that at a normal time when an operation amount of a driver with respect to the brake operating member is equal to or more than a reference value, at a time after a first predetermined time has elapsed since a time when an operation state of the driver with respect to the brake operating member has become a predetermined operation state.

Moreover, according to another aspect of the invention, a method is provided including a step of generating a braking force higher than that at a normal time when an operation amount of a driver with respect to a brake operating member is equal to or more than a reference value, at a time after a first predetermined time has elapsed since a time when an operation state of the driver with respect to the brake operating member has become a predetermined operation state.

Furthermore, a vehicle braking force control device according to another embodiment is provided with a brake operating member, and a control portion which starts brake assist control for generating a braking force higher than that at a normal time when an operation amount of the driver with respect to the brake operating member is equal to or more than a reference value of an operation amount, at a time after a second predetermined time has elapsed since a time when an operation speed of the driver with respect to the brake operating member has become equal to or less than a reference value of the operation speed, after an operation state of the driver with respect to the brake operating member has become a predetermined operation state.

Moreover, when the operation amount of the driver with respect to the brake operating member is equal to or more than the reference value of the operation amount at the time after the second predetermined time has elapsed since the time when the operation speed of the driver with respect to the brake operating member has become equal to or less than the reference value of the operation speed, after the operation state of the driver with respect to the brake operating member has become the predetermined operation state, a braking force higher than that of the normal time is generated.

BRIEF DESCRIPTION OF THE DRAWINGS

FIG. 1 is a schematic diagram of a braking force control device and a block diagram of a control system according to one embodiment of a first aspect of the invention;

DETAILED DESCRIPTION OF THE PREFERRED EMBODIMENTS

Figure 2:
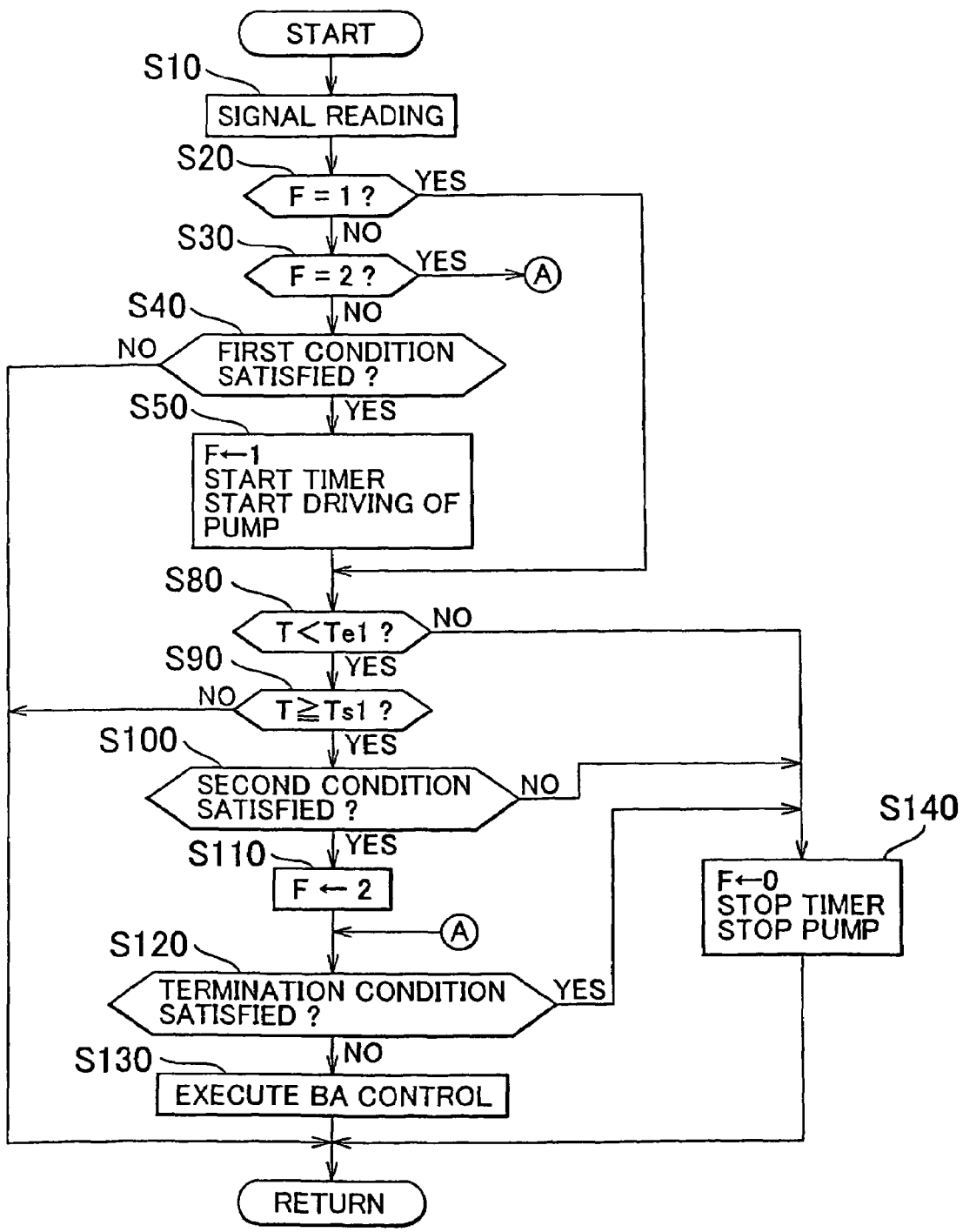
FIG. 2 is a flowchart showing a brake assist control routine of the first embodiment.

Hereinafter, preferred embodiments of the invention will be described in detail referring to the appended drawings.

FIG. 1 is a schematic diagram showing a braking force control device and a block diagram of a control system according to a first embodiment of the invention.

In FIG. 1, a brake device 10 is a diagonal-dual-circuit-type brake device, and has a master cylinder 12. Although not shown in detail in FIG. 1, the master cylinder 12 is of a tandem type having two pressure chambers which are mutually independent and placed in series. Moreover, the master cylinder 12 is coupled to a brake pedal 16 via a vacuum-type booster 14 serving as a servo unit. Furthermore, the master cylinder 12 acts as a brake operating means which generates, in cooperation with the booster 14 and the brake pedal 16, an oil pressure (a master cylinder pressure Pm) in each pressure chamber according to a depression force of the brake pedal 16, in response to a depression operation of the brake pedal 16 by a driver.

A first brake circuit for a right front wheel and a left rear wheel is connected to one pressure chamber of the master cylinder 12. Moreover, a second brake circuit for a left front wheel and a right rear wheel is connected to the other pressure chamber of the master cylinder 12. Since these two brake circuits have the same configuration, only the first brake circuit will be described, and a description of the second brake circuit will be omitted.

In the first brake circuit, one end of a main conduit 18 serving as a main brake pressure control path is connected to the master cylinder 12. The other end of the main conduit 18 is connected to one end of a sub conduit 20FR serving as a brake pressure control path for a right front wheel, and one end of a sub conduit 20RL serving as a brake pressure control path for a left rear wheel. The other ends of the sub conduits 20FR and 20RL are connected to a wheel cylinder 22FR of the right front wheel and a wheel cylinder 22RL of the left rear wheel, respectively.

A normally open solenoid-operated valve 24 which functions as a so-called master cut valve is disposed in the main conduit 18. A non-return bypass conduit 26 which only allows flow of oil from the master cylinder 12 toward the wheel cylinders 22FR and 22RL is connected to the main conduit 18 on both sides of the solenoid-operated valve 24.

One end of an oil intake conduit 28 is connected to the main conduit 18 between the master cylinder 12 and the solenoid-operated valve 24. The other end of the oil intake conduit 28 is connected to an intake side of an oil pump 30 driven by an electric motor not shown in the drawing. A discharge side of the oil pump 30 is connected to one end of a discharge conduit 32, and the other end of the discharge conduit 32 is connected to the main conduit 18. A normally close solenoid-operated valve 34 which functions as an intake control valve is disposed in the oil intake conduit 28.

Normally open solenoid-operated valves 36FR and 36RL serving as pressure increase control valves which control supply of oil to the wheel cylinders 22FR and 22RL of the right front wheel and the left rear wheel are disposed, respectively, in the sub conduits 20FR and 20RL. Non-return bypass conduits 38FR and 38RL which only allow flow of oil from the wheel cylinders 22FR and 22RL toward the solenoid-operated valve 24 are connected, respectively, to the sub conduits 20FR and 20RL on both sides of each solenoid-operated valve 36FR and 36RL.

Moreover, one end of each oil emission conduit 42FR and 42RL is connected, respectively, to the sub conduit 20FR between the solenoid-operated valve 36FR and the wheel cylinder 22FR, and to the sub conduit 2ORL between the solenoid-operated valve 36RL and the wheel cylinder 22RL. The other end of each oil emission conduit 42FR and 42RL is connected to the oil intake conduit 28 on the side of the solenoid-operated valve 34 and the oil pump 30. Normally close solenoid-operated valves 44FR and 44RL serving as pressure reduction control valves which control emission of oil from the wheel cylinders 22FR and 22RL of the right front wheel and the left rear wheel are connected, respectively, to the oil emission conduits 42FR and 42RL. An oil reservoir 40 is connected to the oil emission conduit 42FR.

At normal times, the solenoid-operated valves such as the solenoid-operated valve 24 are maintained in the state shown in FIG. 1. In particular, the oil pump 30 is not driven, and a pressure in each wheel cylinder of the respective wheels is controlled by a pressure in the master cylinder 12 (referred to as the master cylinder pressure). When a rapid braking operation is performed by the driver, the oil pump 30 is driven, the solenoid-operated valve 24 is closed, and the solenoid-operated valve 34 is opened. Accordingly, a brake assist control is executed such that a braking force higher than that at a normal time is generated.

A pressure sensor 46, not shown in the schematic diagram of FIG. 1, is disposed in the master cylinder 12 and detects the oil pressure in the pressure chamber as the master cylinder pressure Pm. As will be described in detail later, the solenoid-operated valve 24, the electric motor driving the oil pump 30, the solenoid-operated valve 34, the solenoid-operated valves 36FR, 36RL, 44FR and 44RL, are controlled by an electronic control device 50, based on the master cylinder pressure Pm. A signal indicating a master cylinder pressure Pm detected by the pressure sensor 46, and a signal indicating whether or not the brake pedal 16 is depressed by the driver from a stop lamp switch (referred to as "STPSW" in the FIG.) 48, are inputted to the electronic control device 50.

Although not shown in detail in FIG. 1, the electronic control device 50 includes a microcomputer. The microcomputer has a central processing unit (CPU), a read-only-memory (ROM), a random-access-memory (RAM) and an input/output port device. The CPU, ROM and RAM may have a generally known configuration in which they are mutually connected by an interactive common bus.

The electronic control device 50 determines in accordance with a brake assist control routine shown in FIG. 2 whether the driver has performed the rapid brake operation. When it is determined that the driver has performed the rapid brake operation, the electronic control device 50 executes the brake assist control to control a brake pressure of each wheel to a higher pressure than the master cylinder pressure Pm and generates a braking force higher than that at a normal time.

Next, a brake assist control routine according to the first embodiment shown in the drawings will be described while referring to the flowchart shown in FIG. 2. A control based on the flowchart shown in FIG. 2 is started when an ignition switch, not shown, is turned on. This control is repeatedly executed at predetermined times. Moreover, when the control based on the flowchart shown in FIG. 2 is started, prior to step S10, a flag F is reset to 0, a count value of a timer is reset to 0 and the solenoid-operated valve 24 and other valves, are set to ordinary positions shown in FIG. 1.

Firstly, the signal indicating the master cylinder pressure Pm detected by the pressure sensor 46, and other signals, are read in step S10. Next, it is determined whether the flag F is 1. In other words, it is determined whether a first starting condition of the brake assist control has already been satisfied in step S40, described later. When a positive determination is made, the control proceeds to step S80, whereas, when a negative determination is made, the control proceeds to step S30.

In step S30, it is determined whether the flag F is 2. In other words, it is determined whether a second starting condition of the brake assist control has already been satisfied in step S100, described later. When a positive determination is made in step S30 the control proceeds to step S120, whereas when a negative determination is made, the control proceeds to step S40.

In step S40, it is determined whether the first starting condition of the brake assist control is satisfied. That is, it is determined whether an operation state of the driver with respect to the brake pedal 16 is a predetermined state. When a negative determination is made in step S40, the control based on the routine shown in FIG. 2 is terminated once at this point. However, when a positive determination is made, the control proceeds to step S50.

In this case, the determination as to whether the first starting condition of the brake assist control is satisfied may be, for example, a determination as to whether the stop lamp switch 48 is ON, and the master cylinder pressure Pm is equal to or more than a first reference value Pm1 (a positive constant) and a rate of change ΔPm of the master cylinder pressure is equal to or more than a first reference value ΔPm1 (a positive constant). The condition that the stop lamp switch 48 is ON may be omitted.

In step S50, the flag F is set to 1, the timer is started, and driving of the oil pump 30 is started as a result of a driving current passing to the electric motor driving the oil pump 30. At this stage, the solenoid-operated valve 24 is maintained in an opened state, and the solenoid-operated valve 34 is maintained in a closed state. Therefore, the oil pump 30 does not discharge oil.

In step S80, it is determined whether a count value T of the timer is less than a reference value Te1 (a positive constant). When a negative determination is made, control proceeds to step S140, whereas when a positive determination is made, control proceeds to step S90. In step S80, a fail-safe determination is executed for preventing the brake assist control from being started unnecessarily when the second starting condition of the brake assist control is not satisfied even though a relatively long time has elapsed since the first starting condition of the brake assist control has been satisfied.

In step S90, it is determined whether the count value T of the timer is equal to or more than a reference value Ts1 (a positive constant smaller than Te1). In other words, it is determined whether a first predetermined time ΔT1 (a positive constant) has elapsed since a time when the first starting condition of the brake assist control was determined as being satisfied in step S40 described above. When a negative determination is made, control based on the routine shown in FIG. 2 is terminated once at this point. However, when a positive determination is made, control proceeds to step S100.

In step S100, it is determined whether the second starting condition of the brake assist control is satisfied. When a negative determination is made, control proceeds to step S140. When a positive determination is made, the flag F is set to 2 in step S110, and thereafter, control proceeds to step S120. The determination as to whether the second brake assist control starting condition is satisfied may be, for example, a determination as to whether the master cylinder pressure Pm is equal to or more than a second reference value Pm2 (a positive constant). Moreover, although the second reference value Pm2 is preferably a larger value than the first reference value Pm1, it may be a value equal to or less than the first reference value Pm1.

In step S120, it is determined whether a termination condition of the brake assist control is satisfied. For example, it is determined whether the master cylinder pressure Pm is equal to or less than a reference value Pme for control termination (a positive constant smaller than the first reference value Pm1 and the second reference value Pm2), or whether the rate of change ΔPm of the master cylinder pressure is equal to or less than a reference value ΔPme for control termination (a negative constant). When a positive determination is made, control proceeds to step S140, whereas when a negative determination is made, control proceeds to step S130.

In step 130, the solenoid-operated valve 24 is closed, and the solenoid-operated valve 34 is opened. Then, in this state, the solenoid-operated valves 36FR, 36RL, 44FR and 44RL, are controlled so as to open and close in a manner well known in this technical field. Accordingly, the brake assist control executes control such that the pressures in the wheel cylinders 22FR and 22RL become higher than the master cylinder pressure Pm. In step 140, the flag F is reset to 0, the timer is stopped, the count value is reset to 0, the oil pump 30 is stopped, the solenoid-operated valve 24 is opened, and the solenoid-operated valve 34 is closed.

As is apparent from the above description, when a brake operation is not performed by the driver and when a normal brake operation is performed, the first starting condition of the brake assist control is not satisfied. Accordingly, the negative determinations are made in steps S20 and S40, respectively, and the brake assist control is not executed. Therefore, when the normal brake operation is performed by the driver, the brake pressure of each wheel is controlled to a pressure equal to the master cylinder pressure Pm.

On the contrary, when the rapid braking operation is performed by the driver, for example, when avoiding a risk, the master cylinder pressure Pm and the rate of change of the master cylinder pressure Pm become high values, and the first starting condition of the brake assist control is satisfied. Accordingly, the positive determination is made in step S40, driving of the oil pump 30 is started in step S50, and the oil pump 30 is placed in a state in which it is capable of discharging high-pressure oil.

Then, when as a result of the rapid brake operation being continued by the driver, the second starting condition of the brake assist control is satisfied at the time after the first predetermined time ΔT1 has elapsed since the time when the first starting condition of the brake assist control was satisfied, the positive determination is made in step 100. Next, until the termination condition of the brake assist control is determined as being satisfied in step S120, the brake assist control is executed in step S130. Until this time, the brake pressure of each wheel is controlled to the value higher than the master cylinder pressure Pm. Furthermore, this value changes in accordance with the master cylinder pressure Pm.

Moreover, in a case where the rapid braking operation is performed by the driver, but the brake operation is tapping, the second starting condition of the brake assist control is not satisfied at the time after the first predetermined time ΔT1 has elapsed since the time when the first starting condition of the brake assist control was satisfied. Therefore, the negative determination is made in step 100, the oil pump 30 is stopped in step 140, and the solenoid-operated valve 24, and other valves, are returned to the ordinary positions shown in FIG. 1. Consequently, unnecessary execution of the brake assist control is prevented in the case where the driver performs the tapping brake operation.

Figure 3:
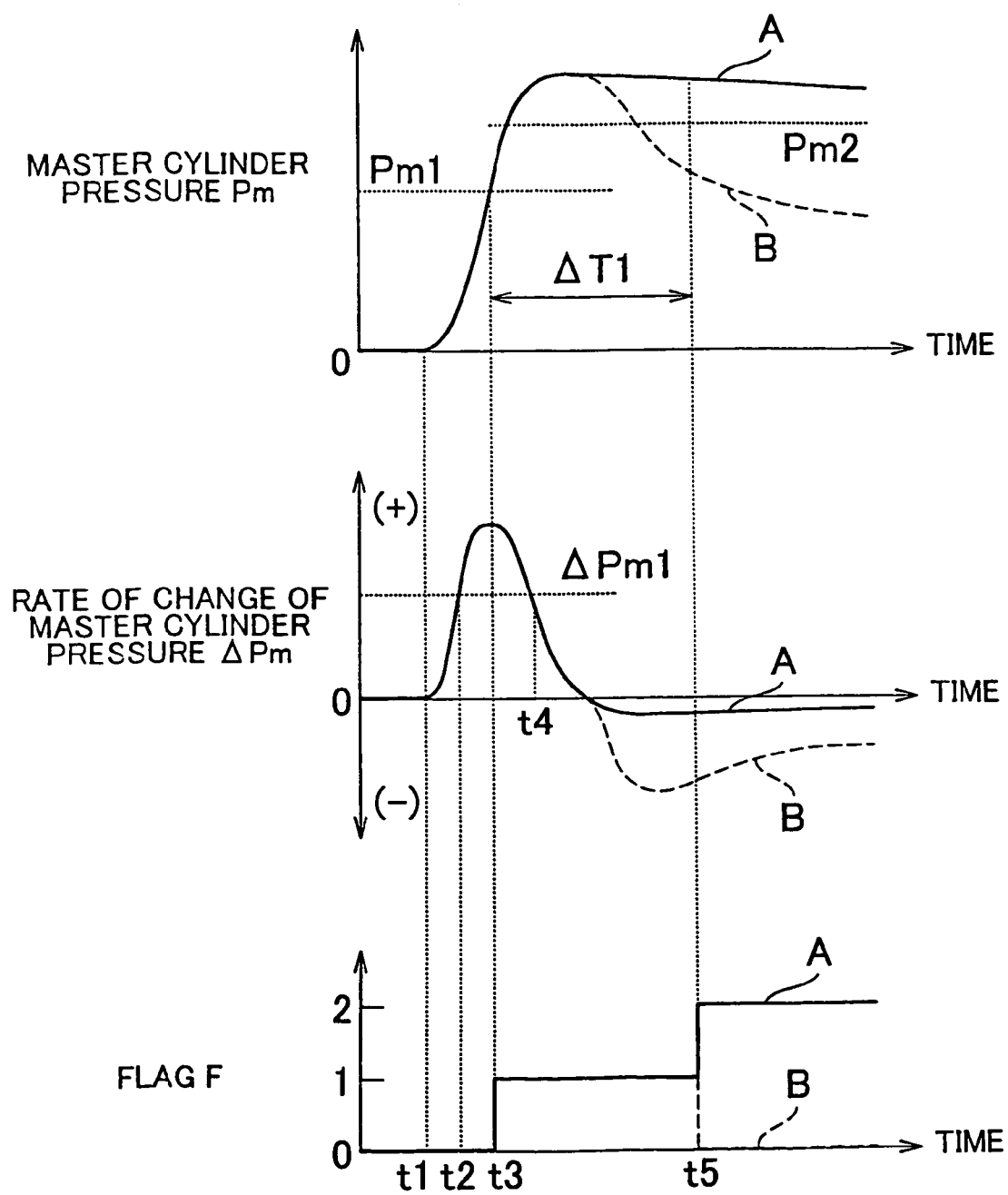
FIG. 3 is a graph showing an example of changes of a master cylinder pressure Pm, a rate of change ΔPm of the master cylinder pressure Pm and a flag F in a case (A) where a driver performs a rapid braking operation, and a case (B) where the driver performs a tapping brake operation, according to the first embodiment.

For example, FIG. 3 shows an example of changes of the master cylinder pressure Pm, the rate of change ΔPm of the master cylinder pressure Pm and the flag F in a case (A) where the driver performs the rapid braking operation and a case (B) where the driver performs the tapping brake operation.

As shown in FIG. 3, at a time t1, the driver begins to depress the brake pedal 16. At a time t2, the rate of change ΔPm of the master cylinder pressure becomes equal to or more than the first reference value ΔPm1. At a time t3 it is assumed that the master cylinder pressure Pm becomes equal to or more than the first reference value Pm1, and thus the first starting condition of brake assist control is satisfied. Moreover, with the rapid braking of case (A), the master cylinder pressure Pm decreases slightly after reaching a peak value. However, it is assumed that with the tapping of case B, the master cylinder pressure Pm decreases a comparatively large amount after reaching a peak value.

In the case of the conventional braking force control devices, driving of the oil pump 30 is started at the time t3, and the master cylinder pressure Pm comes close to the peak value. Then, the brake assist control is started at a time t4 when the rate of change ΔPm of the master cylinder pressure becomes smaller than a pressure rise gradient. As a result, the brake assist control is executed unnecessarily for the tapping of case B.

On the other hand, according to the first embodiment shown in the drawings, the brake assist control is only executed when the master cylinder pressure Pm is equal to or more than the second reference value Pm2 at a time t5 when the first predetermined time ΔT1 has elapsed since the time t1. Therefore, it is possible to execute the brake assist control for the rapid braking of case A, and prevent the brake assist control from being executed unnecessarily for the tapping of case B.

Moreover, in order to prevent the brake assist control from being executed unnecessarily in the case of tapping with the conventional braking force control devices, the reference values Pm1 and ΔPm1 of the first starting condition need to be set high. However, in this case, for example, when a negative pressure of the booster 14 decreases, the value of the master cylinder pressure Pm and a rate of increase of the value of the master cylinder pressure Pm both decrease, as compared to those at a normal time, with respect to a depression amount and a depression speed of the brake pedal 16 generated by the driver. Therefore, cases occur where the brake assist control is not executed despite the fact that the driver is performing the rapid braking operation.

According to the first embodiment shown in the drawings, it is determined whether the second starting condition is satisfied at the time after the first predetermined time $\Delta T1$ has elapsed since the time when the first starting condition of brake assist was satisfied. Therefore, it is possible to make the reference values Pm1 and $\Delta$Pm1 of the first starting condition low as compared with those of the conventional braking force control devices. Consequently, even in a case where the driver performs the rapid braking operation under a condition where the negative pressure of the booster 14 is decreased, it is possible to execute the brake assist control.

Figure 4:
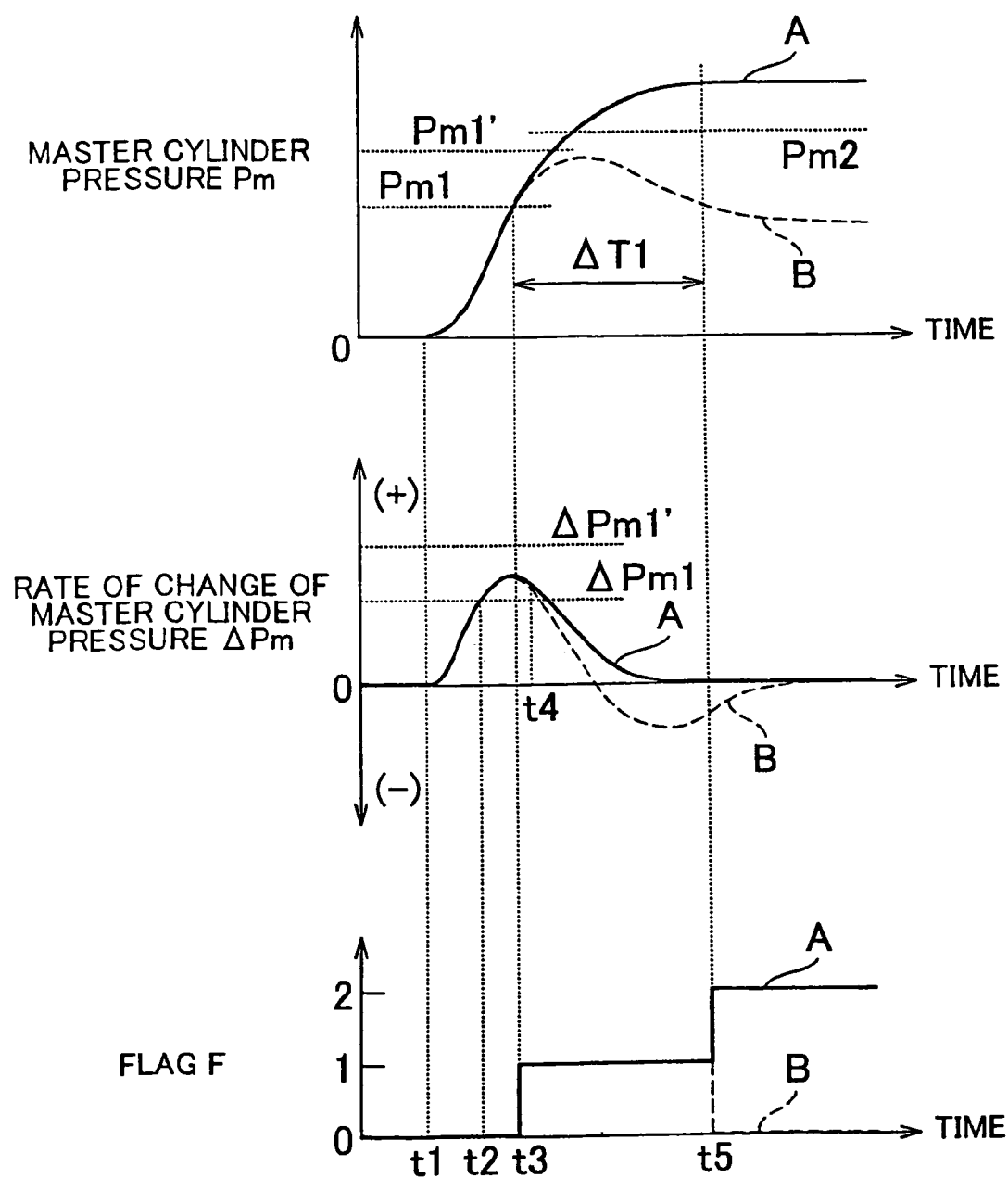
FIG. 4 is a graph showing an example of changes of the master cylinder pressure Pm, the rate of change ΔPm of the master cylinder pressure Pm and the flag F in a case (A) where the driver performs the rapid braking operation under a condition where a negative pressure of a booster is low, and a case (B) where the driver performs a gentle brake operation under a condition where the negative pressure of the booster is high, according to the first embodiment.

For example, FIG. 4 shows an example of changes of the master cylinder pressure Pm, the rate of change $\Delta$Pm of the master cylinder pressure Pm and the flag F in a case (A) where the driver performs the rapid braking operation under a condition where the negative pressure of the booster is low, and a case (B) where the driver performs a gentle brake operation under a condition where the negative pressure of the booster is high.

As shown in FIG. 4, at a time t1, the drivers starts to depress the brake pedal 16. Then, it is assumed that the rate of change $\Delta$Pm of the master cylinder pressure becomes equal to or more than the first reference value $\Delta$Pm1 at a time t2, and the master cylinder pressure Pm becomes equal to or more than the first reference value Pm1 at a time t3. Accordingly, the first starting condition of brake assist control is satisfied. Moreover, it is assumed that the master cylinder pressure Pm gradually increases after the time t3 in case A, whereas the master cylinder pressure Pm decreases after reaching a peak value at a time t4 in case B.

In the case of the conventional braking force control devices, when the reference values Pm1 and $\Delta$Pm1 of the first starting condition are set to high values Pm1' and $\Delta$Pm1' to prevent the brake assist control from being executed unnecessarily in the case of tapping, the rate of change $\Delta$Pm of the master cylinder pressure does not become high, particularly in case A. Therefore, the first starting condition is not satisfied, and the brake assist control is not executed despite the fact that the driver rapidly depresses the brake pedal.

On the other hand, according to the first embodiment shown in the drawings, as described above, it is possible to make the reference values Pm1 and $\Delta$Pm1 lower than before. Accordingly, in case A as well, the rate of change $\Delta$Pm of the master cylinder pressure Pm becomes equal to or more than the reference value $\Delta$Pm1, and the first starting condition is satisfied. Therefore, the second starting condition is also satisfied so long as the master cylinder pressure P is equal to or more than the second reference value Pm 2 at a time t5 after the predetermined time $\Delta T1$ has elapsed since the time t1. Thus, it is possible for the brake assist control to be executed.

Moreover, a case will be described where the driver performs the gentle brake operation, as in case B, under a condition where the negative pressure of the booster 14 is normal. In this case, even when the first starting condition is satisfied, the second starting condition is not satisfied when the master cylinder pressure Pm is less than the second reference value Pm2 at the time t5. Therefore, it is possible to prevent the brake assist control from being executed unnecessarily after the time t5.

Figure 5:
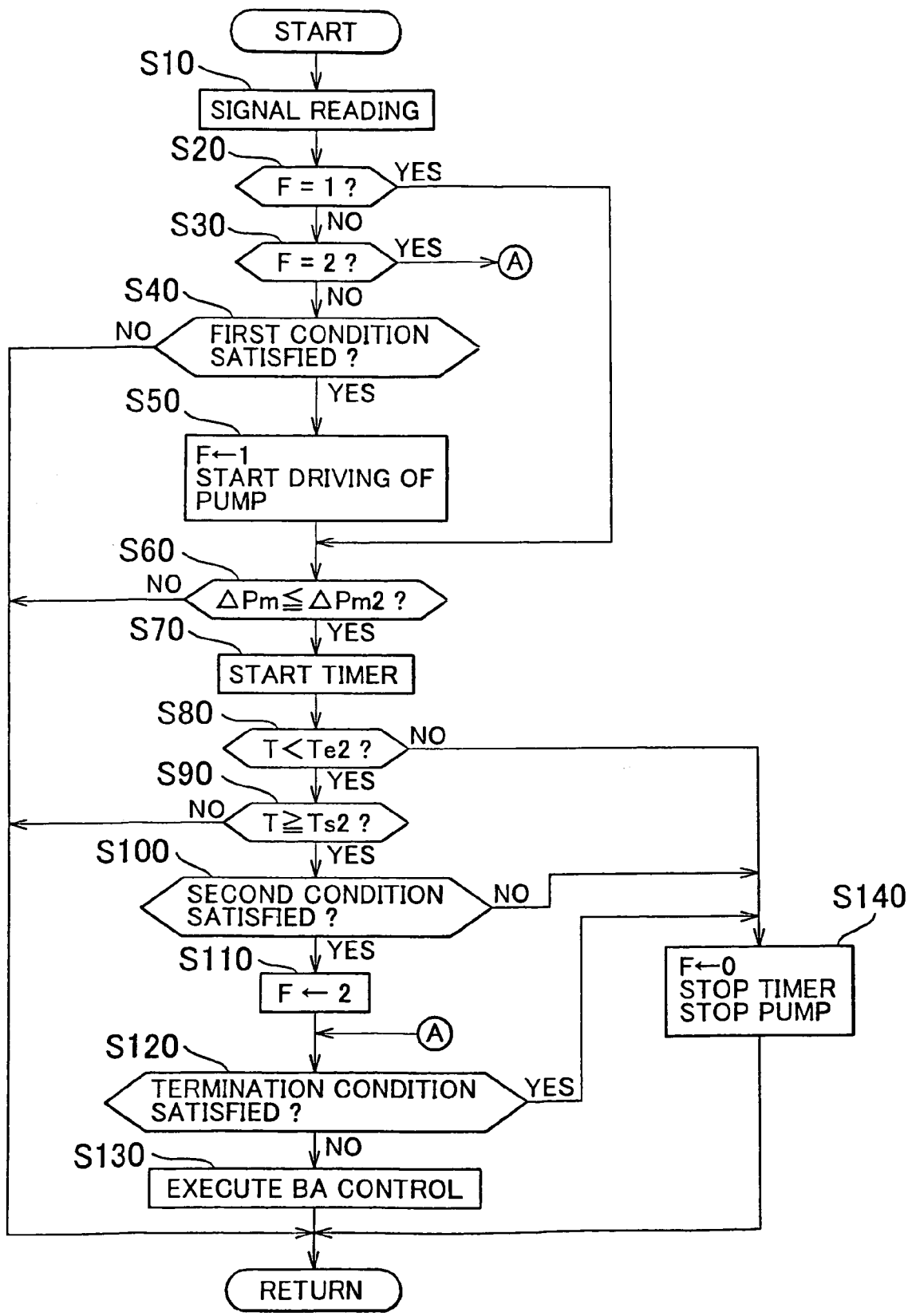
FIG. 5 is a flowchart showing a brake assist control routine according to an embodiment of a second aspect of the invention.

FIG. 5 is a flowchart showing a brake assist control routine of a braking force control device according to a second embodiment of the invention. In FIG. 5, the steps that are the same as those shown in FIG. 2, are marked with the same step numbers as indicated in FIG. 2.

According to this embodiment, when the positive determination is made in step 40, that is, when the first starting condition of the brake assist control is determined to be satisfied, the flag F is set to 1 in step S50. Then, driving of the oil pump 30 is started, and thereafter, control proceeds to step S60.

In step S60, it is determined whether the rate of change $\Delta$Pm of the master cylinder pressure is equal to or less than a second reference value $\Delta$Pm2 (a positive constant smaller than the first reference value $\Delta$Pm1). In other words, it is determined whether the brake operation of the driver comes close to a steady braking state and the pressure rise gradient of the master cylinder pressure has become small. When a negative determination is made, the control based on the routine shown in FIG. 5 is terminated once at this point. However, when a positive determination is made, the timer is started in step S70, and thereafter, control proceeds to step S80.

The other steps of this embodiment are executed in the same manner as in the first embodiment described above. Moreover, reference values Te2 and Ts2 of determinations executed in steps S80 and S90 of this embodiment may be smaller values than the reference values Te1 and Ts1 according to the first embodiment. Accordingly, a second predetermined time $\Delta T2$ may also be a smaller value than the first predetermined time $\Delta T1$ according to the first embodiment. Furthermore, a second reference value Pm2 in this embodiment may be a different value from the second reference value Pm2 in the first embodiment.

Thus, according to the second embodiment, in a case where the master cylinder pressure Pm and the rate of change $\Delta$Pm of the master cylinder pressure Pm become equal to or more than the first reference values Pm1 and $\Delta$Pm1, respectively, and the first starting condition of the brake assist control has been satisfied, and the master cylinder pressure Pm becomes equal to or more than the second reference value Pm2 at the time after the second predetermined time $\Delta T2$ has elapsed since the time when the rate of change $\Delta$Pm of the master cylinder pressure became equal to or less than the second reference value $\Delta$Pm2, the brake assist control is started.

Figure 6:
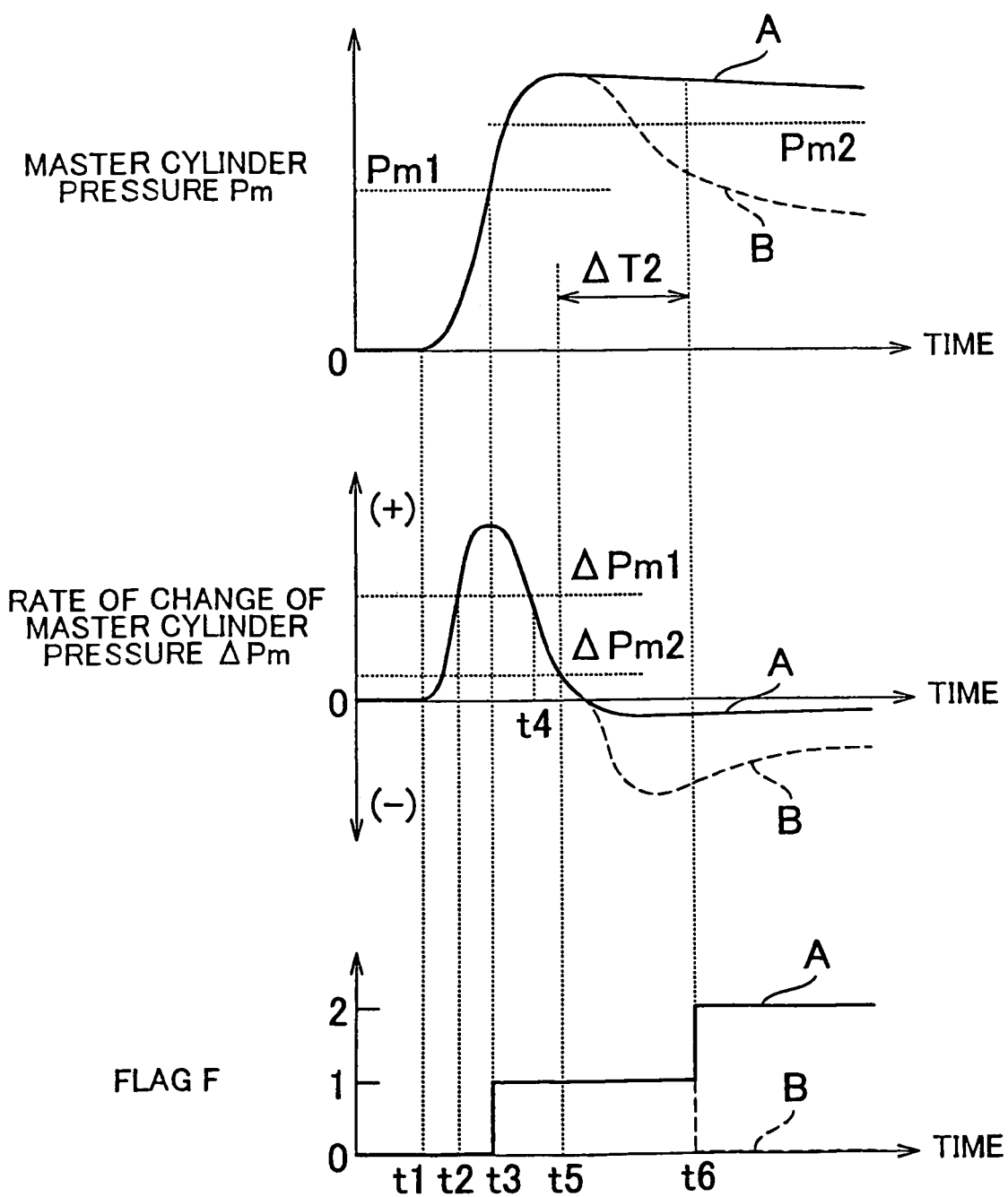
FIG. 6 is a graph showing an example of changes of the master cylinder pressure Pm, the rate of change ΔPm of the master cylinder pressure Pm and the flag F in a case (A) where the driver performs the rapid braking operation, and a case (B) where the driver performs the tapping brake operation, according to the second embodiment.
Figure 7:
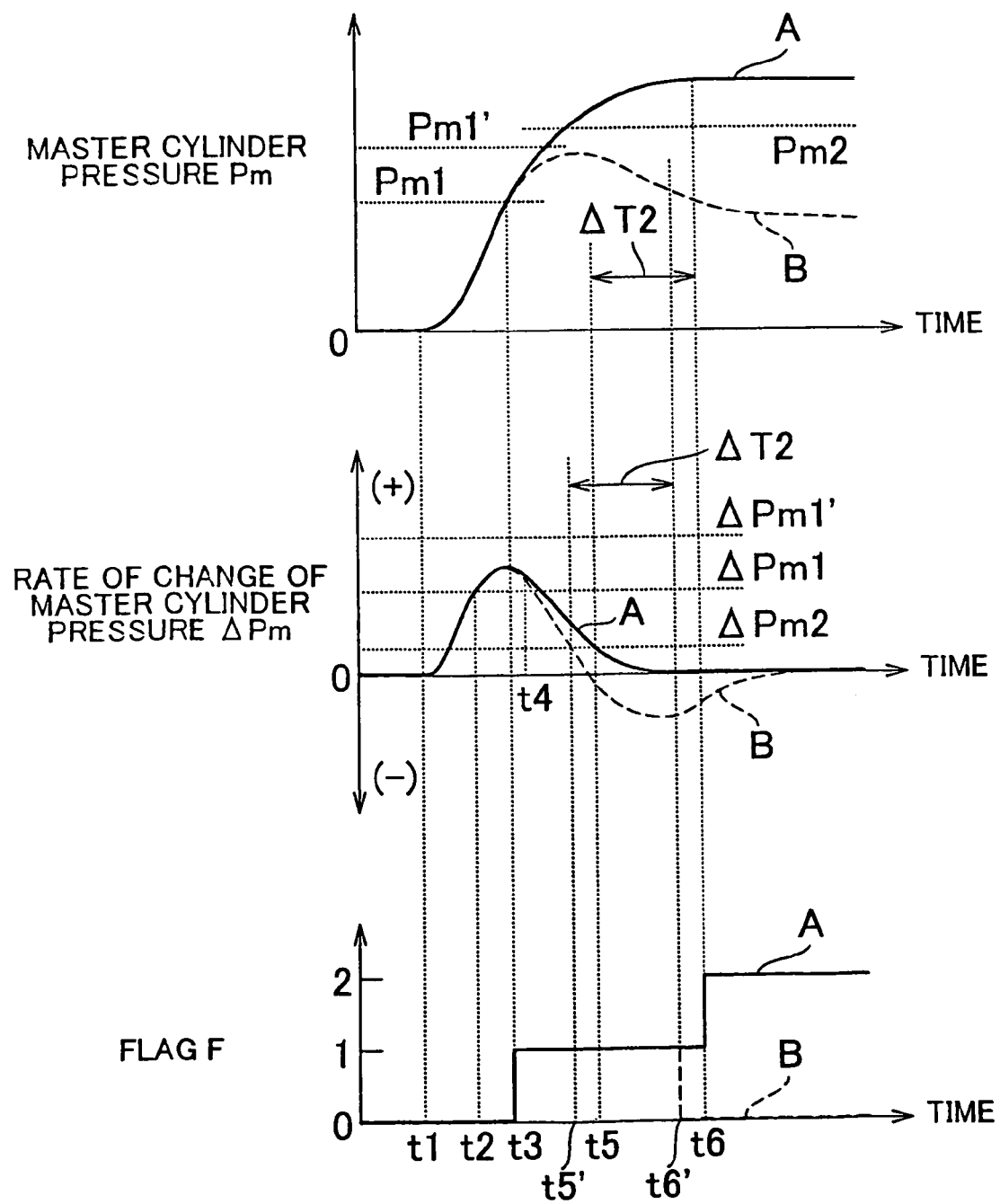
FIG. 7 is a graph showing an example of changes of the master cylinder pressure Pm, the rate of change ΔPm of the master cylinder pressure Pm and the flag F in a case (A) where the driver performs the rapid braking operation under a condition where a negative pressure of a booster is low, and a case (B) where the driver performs a gentle brake operation under a condition where the negative pressure of the booster is high, according to the second embodiment.

FIG. 6 is a graph similar to FIG. 3 showing an example of changes of the master cylinder pressure Pm, the rate of change $\Delta$Pm of the master cylinder pressure Pm and the flag F in a case (A) where the driver performs the rapid braking operation, and a case (B) where the driver performs the tapping brake operation, according to the second embodiment. FIG. 7 is a graph similar to FIG. 4 showing an example of changes of the master cylinder pressure Pm, the rate of change $\Delta$Pm of the master cylinder pressure Pm and the flag F in a case (A) where the driver performs the rapid braking operation under a condition where the negative pressure of the booster is low, and a case (B) where the driver performs the gentle brake operation under a condition where the negative pressure of the booster is high, according to the second embodiment.

In the case of brake operations A and B shown in FIG. 6, it is determined whether to start the brake assist control based on whether the master cylinder pressure Pm is equal to or more than the second reference value Pm2, at a time t6 after the second predetermined time ΔT2 has elapsed since a time t5 when the rate of change ΔPm of the master cylinder pressure became equal to or less than the second reference value ΔPm2. Then, the brake assist control is executed for the rapid braking operation in case A, whereas the brake assist control is not executed for the tapping operation in case B.

Moreover, in the case of the brake operation in case A shown in FIG. 7, it is determined whether to start the brake assist control based on whether the master cylinder pressure Pm is equal to or more than the second reference value Pm2, at the time t6 after the second predetermined time ΔT2 has elapsed since the time t5 when the rate of change ΔPm of the master cylinder pressure became equal to or less than the second reference value ΔPm2. Then, for the brake operation in case B shown in FIG. 7, it is determined whether to start the brake assist control based on whether a master cylinder pressure Pm at a time t6' is equal to or more than the second reference value Pm2, after the second predetermined time ΔT2 has elapsed since a time t5' when the rate of change ΔPm of the master cylinder pressure became equal to or less than the second reference value ΔPm2. Even when the negative pressure of the booster decreases, the brake assist control is executed for the rapid braking operation in case A. On the other hand, even when the negative pressure of the booster is normal, the brake assist control is not executed for the relatively gentle brake operation in case B.

Therefore, according to the second embodiment shown in the drawings, as in the first embodiment described above, in the case where the driver performs the rapid braking operation, it is possible to execute the brake assist control. Moreover, in the case where the tapping brake operation is performed by the driver, it is possible to prevent the brake assist control from being executed unnecessarily. Furthermore, in the case where the driver performs the gentle brake operation under the condition where the negative pressure of the booster 14 is normal, it is possible to prevent the brake assist control from being executed unnecessarily. Moreover, in the case where the driver performs the rapid braking operation under the condition where the negative pressure of the booster 14 is decreased, it is possible to execute the brake assist control.

According to the first and second embodiments shown in the drawings, it is determined in step S80 whether the count value T of the timer is less than one of the reference values Te1 and Te2. Step S90 and the following steps are only executed when the positive determination is made. Therefore, even in a case where the second starting condition of the brake assist control is satisfied when a relatively long time has elapsed since the first starting condition of the brake assist control was satisfied, it is possible to prevent the brake assist control from being started unnecessarily.

Furthermore, according to the first and second embodiments, although the brake assist control is delayed as compared with the conventional braking force control devices, it is possible to prevent the brake assist control from being unnecessarily executed when the driver performs the tapping brake operation, and execute the brake assist control when the driver performs the rapid braking operation, even when responsiveness of the brake operating member decreases.

Moreover, according to the first and second embodiments, the reference values Pm1, Pm2, ΔPm1 and ΔPm2 related to the master cylinder pressure and the rate of change of the master cylinder pressure, and the reference values Te1, Te2, Ts1 and Ts2 related to the time are set to optimal values. These optimal values are set, for example, experimentally in accordance with the vehicle to which the braking force control device of the invention is applied, so that the aforementioned operational effects can be obtained.

Although the invention is described above in detail referring to the specific embodiments, the invention is not limited by the aforementioned embodiments, and it will be apparent to those skilled in the art that other embodiments of various kinds can be made within the scope of the invention.

For example, although, in the respective embodiments described above, the operation amount of the driver with respect to the brake operating member and the rate of change of the operation amount are the master cylinder pressure and the rate of change of the master cylinder pressure, respectively, the operation amount of the driver may be the depression force of the brake pedal serving as an operating element of the brake operating member or a stroke of the brake pedal. Moreover, the rate of change of the operation amount of the driver may be a rate of change of the depression force of the brake pedal, or a rate of change of the stroke.

Furthermore, in the respective embodiments described above, it is determined in step 80 whether the count value T of the timer is less than the reference values Te1 or Te2. Step 90 and the following steps are only executed when the positive determination is made. However, this fail-safe determination in step 80 may be omitted.

Moreover, according to the first embodiment, the first predetermined time ΔT1 is counted from the time when the first starting condition of the brake assist control is satisfied as a result of the master cylinder pressure Pm becoming equal to or more than the first reference value Pm1 and the rate of change ΔPm of the master cylinder pressure becoming equal to or more than the first reference value ΔPm1. However, counting of the first predetermined time ΔT1 may be started at the time which is earlier among the time when the master cylinder pressure Pm becomes equal to or more than the reference value Pm1, and the time when the rate of change ΔPm of the master cylinder pressure becomes equal to or more than the first reference value ΔPm1.

Furthermore, according to the second embodiment, the second reference value Pm2, used for the determination regarding the master cylinder pressure Pm after the first starting condition of the brake assist control is satisfied, is a positive constant. However, the second reference value Pm2 may be 0 or a negative value as long as this value is smaller than the first reference value Pm1.

Moreover, the brake device according to each embodiment described above is a hydraulic brake device of a diagonal dual circuit type, and the brake pressure of each wheel is controlled so as to be the master cylinder pressure Pm at times of normal brake operation. However, so long as the brake assist control can be executed, the brake device to which the braking force control device of the invention is applied may have any construction which is well known in this technical field, such as, for example, a brake-by-wire-type brake device. Moreover, although the brake device according to each embodiment described above has the vacuum-type booster, the booster may be a high-pressure-type booster.

According to one preferred embodiment of the invention, in the configuration of a first aspect, the braking force control device is such the brake assist control starts in the case where the operation amount of the driver with respect to the brake operating member is equal to or more than the second reference value which is higher than the first reference value of the operation amount, at the time after the first predetermined time has elapsed since the time when the operation amount of the driver with respect to the brake operating member has become equal to or more than the first reference value of the operation amount, and the rate of change of the operation amount of the driver with respect to the brake operating member has become equal to or more than the first reference value of the rate of change (a first preferred embodiment).

According to another preferred embodiment of the invention, in the configuration of the above first preferred embodiment, the braking force control device is such that the brake operating member includes the master cylinder, and the operation amount of the driver with respect to the brake operating member and the rate of change of the operation amount are the master cylinder pressure and the rate of change of the master cylinder pressure, respectively (a second preferred embodiment).

According to another preferred embodiment of the invention, in the configuration of the above second preferred embodiment, the braking force control device is such that the brake operating member includes a vacuum-type booster (a third preferred embodiment).

According to another preferred embodiment of the invention, in the configuration of a second aspect, the braking force control device is such that the brake assist control starts in the case where the operation amount of the driver with respect to the braking operation member is equal to or more than the second reference value which is higher than the first reference value, at the time after the second predetermined time has elapsed since the rate of change of the operation amount of the driver with respect to the brake operating member has become equal to or less than the second reference value of the rate of change, after the operation amount of the driver with respect to the brake operating member has become equal to or more than the first reference value of the operation amount and the rate of change of the operation amount of the driver with respect to the brake operating member has become equal to or more than the first reference value of the rate of change (a fourth preferred embodiment).

According to yet another preferred embodiment of the invention, in the configuration of the above fourth preferred embodiment, the braking force control device is such that the brake operating member includes the master cylinder, and the operation amount of the driver with respect to the brake operating member and the rate of change of the operation amount are the master cylinder pressure and the rate of change of the master cylinder pressure, respectively (a fifth preferred embodiment).

According to yet another preferred embodiment of the invention, in the configuration of the above fifth preferred embodiment, the braking force control device is such that an operation speed of the driver with respect to the brake operating member is the rate of change of the master cylinder pressure (a sixth preferred embodiment).

According to yet another preferred embodiment of the invention, in the configuration of the above sixth preferred embodiment, the braking force control device is such that the reference value related to the rate of change of the master cylinder pressure serving as the operation speed of the driver is a smaller value than the first reference value related to the rate of change of the master cylinder pressure for determining that the operation state of the driver has become the predetermined operation state (a seventh preferred embodiment).

According to yet another preferred embodiment of the invention, in the construction of the above fifth preferred embodiment, the braking force control device is such that the brake operating member includes the vacuum-type booster (an eighth preferred embodiment).

What is claimed is:

1. A vehicle braking force control device comprising:
   a brake operating member; and
   a control portion that starts a brake assist control to generate a braking force higher than that at a normal time when an operation amount of a driver with respect to the brake operating member is equal to or more than a reference value, at a time when a first predetermined time has elapsed since a time when an operation state of the driver with respect to the brake operating member has become a predetermined operation state,
   wherein the control portion starts the brake assist control when the operation amount of the driver with respect to the brake operating member is equal to or more than a second reference value of the operation amount at a time when the first predetermined time has elapsed since a time when the operation amount of the driver with respect to the brake operating member has become equal to or more than a first reference value of the operation amount which is lower than the second reference value of the operation amount, and a rate of change of the operation amount of the driver with respect to the brake operating member has become equal to or more than a first reference value of the rate of change of the operation amount.

2. The vehicle braking force control device according to claim 1, wherein the brake operating member includes a master cylinder, and the operation amount of the driver with respect to the brake operating member is a master cylinder pressure, and a rate of change of the operation amount of the driver with respect to the brake operating member is a rate of change of the master cylinder pressure.

3. A control method of a vehicle braking force control device comprising a step of:
   generating a braking force higher than that at a normal time when an operation amount of a driver with respect to a brake operating member is equal to or more than a reference value, at a time when a first predetermined time has elapsed since a time when an operation state of the driver with respect to the brake operating member has become a predetermined operation state,
   starting the brake assist control when the operation amount of the driver with respect to the brake operating member is equal to or more than a second reference value of the operation amount at a time when the first predetermined time has elapsed since a time when the operation amount of the driver with respect to the brake operating member has become equal to or more than a first reference value of the operation amount which is lower than the second reference value of the operation amount, and a rate of change of the operation amount of the driver with respect to the brake operating member has become equal to or more than a first reference value of the rate of change of the operation amount.

4. The vehicle braking force control device according to claim 1, wherein the control portion stops an oil pump that generates the braking force higher than that at the normal time when the operation amount of the driver is lower than the second reference value when the first predetermined time has elapsed.

5. The control method of a vehicle braking force control device according to claim 3, further comprising a step of stopping an oil pump that generates the braking force higher than that at the normal time when the operation amount of the driver is lower than the second reference value when the first predetermined time has elapsed.

* * * * *